US011966555B2

(12) United States Patent
Wolford et al.

(10) Patent No.: US 11,966,555 B2
(45) Date of Patent: Apr. 23, 2024

(54) METHOD AND APPARATUS FOR INCREASING MEASUREMENT ACCURACY USING A CAMERA ENABLED PORTABLE COMPUTING DEVICE

(71) Applicants: Charles Allan Wolford, Centreville, VA (US); Garrett Scott Isaacs, Riverside, CA (US)

(72) Inventors: Charles Allan Wolford, Centreville, VA (US); Garrett Scott Isaacs, Riverside, CA (US)

( * ) Notice: Subject to any disclaimer, the term of this patent is extended or adjusted under 35 U.S.C. 154(b) by 0 days.

(21) Appl. No.: 18/151,836

(22) Filed: Jan. 9, 2023

(65) Prior Publication Data
US 2023/0236703 A1  Jul. 27, 2023

Related U.S. Application Data

(60) Provisional application No. 63/266,540, filed on Jan. 7, 2022.

(51) Int. Cl.
*G06F 3/0481* (2022.01)
*G01C 11/28* (2006.01)
*G06F 3/04842* (2022.01)

(52) U.S. Cl.
CPC ............ *G06F 3/0481* (2013.01); *G01C 11/28* (2013.01); *G06F 3/04842* (2013.01)

(58) Field of Classification Search
CPC .... G06F 3/0481; G06F 3/04842; G01C 11/28
See application file for complete search history.

(56) References Cited

U.S. PATENT DOCUMENTS

| | | | |
|---|---|---|---|
| 8,989,440 B2 | 3/2015 | Klusza et al. |
| 9,574,871 B2 | 2/2017 | Choi |
| 9,607,406 B2 | 3/2017 | Hata et al. |
| 9,787,904 B2 | 10/2017 | Birkler et al. |
| 9,869,544 B2 | 1/2018 | Broga et al. |
| 10,247,541 B2 | 4/2019 | Ni et al. |
| 10,275,901 B2 | 4/2019 | Butterworth |
| 10,475,203 B2 | 11/2019 | Parrott et al. |
| 10,643,344 B1 | 5/2020 | Chuah et al. |
| 10,645,275 B1 | 5/2020 | Chuah et al. |
| 10,679,424 B2 | 6/2020 | Jovanovic et al. |
| 10,789,725 B2 | 9/2020 | Segman |

(Continued)

*Primary Examiner* — Phenuel S Salomon
(74) *Attorney, Agent, or Firm* — Dunlap Bennett & Ludwig, PLLC

(57) ABSTRACT

A system, method, and apparatus for measuring a workspace is provided. The method includes capturing a workspace that is virtually represented on a user interface display of a computing apparatus that image-captured the workspace. The user inputs, via the user interface, a value of a known measurement of a length represented in the virtual workspace. Through the user interface, along the virtual workspace, the user identifies virtual end boundary points of the length associated with the known measurement. The user then defines a defined space within the virtual workspace by placing additional virtual boundary points. The system calibrates from the inputted value and the virtual end boundary points of the known measurement all the remaining measurements of the surface area, which can be used to render a map display and calculate surface area, volume, or any other geometric aspects of the defined space.

10 Claims, 4 Drawing Sheets

(56) References Cited

U.S. PATENT DOCUMENTS

| | | | |
|---|---|---|---|
| 2009/0002719 A1* | 1/2009 | Chang | G01B 11/0608 |
| | | | 356/610 |
| 2011/0115730 A1 | 5/2011 | Kim et al. | |
| 2011/0169998 A1* | 7/2011 | Canetti | H04N 23/671 |
| | | | 348/E5.045 |
| 2013/0197793 A1* | 8/2013 | Vaddadi | G01S 7/4004 |
| | | | 701/300 |
| 2014/0027503 A1* | 1/2014 | Kennedy | G06F 16/58 |
| | | | 235/375 |
| 2017/0270686 A1 | 9/2017 | Couch | |
| 2017/0302908 A1 | 10/2017 | Richards | |
| 2019/0028637 A1* | 1/2019 | Kolesov | H04N 23/63 |
| 2019/0340799 A1* | 11/2019 | Dryer | G06F 3/0488 |
| 2021/0241483 A1* | 8/2021 | Dryer | G06F 3/04845 |
| 2022/0261066 A1* | 8/2022 | Dryer | G06F 3/04845 |

* cited by examiner

METHOD AND APPARATUS FOR INCREASING MEASUREMENT ACCURACY USING A CAMERA ENABLED PORTABLE COMPUTING DEVICE

CROSS-REFERENCE TO RELATED APPLICATION

This application claims the benefit of priority of U.S. provisional application No. 63/266,540, filed Jan. 7, 2022, the contents of which are herein incorporated by reference.

BACKGROUND OF THE INVENTION

The present invention relates to measurement systems, and more particularly to apparatus and methods for measuring a workspace.

Using cameras to take measurements of a workspace introduces a degree of inaccuracy, resulting in imprecise measurements.

Other methods relying only on the camera's properties can develop a high degree of inaccuracy. Furthermore, differences in the properties between camera manufacturers can introduce inaccuracies. In yet other systems, the user needs to print and place a plurality of "markers" to designate the space to be measured.

As can be seen, there is a need for improved systems, methods, and apparatus for measuring a workspace that minimizes measurement inaccuracies between camera manufacturers and does not require users to print anything out and distribute them throughout the area to be measured.

SUMMARY OF THE INVENTION

In one aspect of the present invention, a method for measuring a workspace, the method includes the following: displaying, via a software application running on a computing device, a virtual workspace of a space captured by an image capturing device operatively associated with the computing device; receiving, via the software application, first and second selections by a user along a portion of the space represented by the virtual workspace, defining two boundary points of a length of a knowable value; receiving, via the software application, an inputted value of the knowable value; receiving, via the software application, at least one or more additional selections by the user along a remaining portion of the space represented by the virtual workspace, defining one or more, respectively, boundary points of a closed space; and calculating, via the software application, measurements between adjacent selections based in part on a comparison between the inputted value and a measurement, via the software application, between the first and second selections.

In another aspect of the present invention, a method of improving modeling measurements of a workspace includes the following: displaying, via a processor, running on a computing device, a virtual workspace of a space captured by an image capturing device operatively associated with the computing device; receiving, via the processor, first and second selections by a user along a portion of the space represented by the virtual workspace, defining two boundary points of a length of a knowable value; receiving, via the processor, a known value of the knowable value; calculating, via the processor, a measurement of the knowable value; and calibrating, via the processor, a calibration ratio between the known value and a known measurement, by the processor, of the two boundary points.

In yet another aspect of the present invention, the method of improving modeling measurements of the workspace further includes: receiving, via the processor, at least one or more additional selections by the user along another portion of the space represented by the virtual workspace, defining one or more, respectively, boundary points of a closed space; and applying, via the processor, the calibration ratio to each subsequent measurement, by the processor, of each two adjacent selections, wherein each selection is a virtual dot, wherein operative association of the image capturing device and the space comprises scanning the space; and further including displaying, via the processor, an intermediate mapping model on a user interface of the computing device, wherein the intermediate mapping model coinciding with each selection, wherein the intermediate mapping model is represented within the virtual workspace; displaying, via the processor, a final map defined by all the selections, wherein each selection is identified on the final map, wherein one or more captured images are juxtaposed with the final map, and wherein, for each captured image, a photo icon is identified on the final map so that the photo icon is identified a location along the space from which the captured image was captured.

These and other features, aspects and advantages of the present invention will become better understood with reference to the following drawings, description and claims.

BRIEF DESCRIPTION OF THE DRAWINGS

FIG. 2 is a schematic view of an exemplary embodiment of the present invention, illustrating a calibration process incorporating at least a portion of a captured surface area to measure, wherein FIGS. 2-6 represent a virtual workspace displayed on a user interface of a computing device.

FIG. 3 is a schematic view of an exemplary embodiment of the present invention, illustrating input of a value of a known measurement captured during the calibration process within the captured surface area.

FIG. 4 is a schematic view of an exemplary embodiment of the present invention, illustrating the placement of a first virtual pin (16) during a pinning step during the calibration process, wherein the first virtual pin identifies the first end of the known measurement.

FIG. 5 is a schematic view of an exemplary embodiment of the present invention, illustrating the placement of a second virtual pin (16) in a subsequent pinning step in the calibration process, wherein the second virtual pin identifies the second end of the known measurement 18.

FIG. 6 is a schematic view of an exemplary embodiment of the present invention, illustrating the placement of one or more additional virtual pins during a surface area measurement process.

DETAILED DESCRIPTION OF THE INVENTION

The following detailed description is of the best currently contemplated modes of carrying out exemplary embodiments of the invention. The description is not to be taken in a limiting sense but is made merely for the purpose of illustrating the general principles of the invention, since the scope of the invention is best defined by the appended claims.

Broadly, embodiments of the present invention provide a system method and apparatus for measuring a workspace that minimizes measurement inaccuracies between camera manufacturers and does not require users to print anything out and distribute reference markers throughout the area to be measured.

As stated above, using cameras to take measurements includes some degree of inaccuracy, resulting in imprecise measurements. A solution according to aspects of the invention is to have users input a value associated with a known accurate measurement of an object or line which the software application utilizes for during a calibration process. The application may then be utilized to execute a virtual "pinning" process in which the user identifies a plurality of boundary points to indicate the desired measurement points for the workspace to be measured. The application can then extrapolate all other measurements of the workspace and obtain a higher degree of accuracy for any additional measurements.

In some embodiments, the first and second virtual pins define the endpoints of a line that corresponds with the known accurate measurement the user inputted. Thereafter, the user continues to input additional virtual pins to define a closed loop associated with a surface area the user is interested in measuring.

Figure 1:
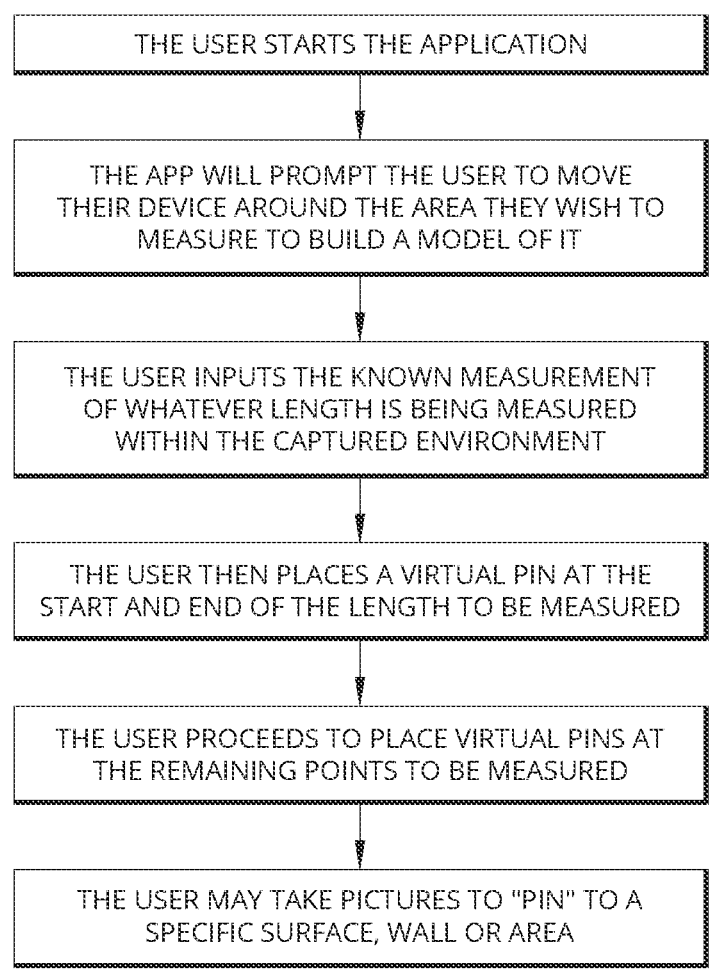
FIG. 1 is a flow chart of an exemplary embodiment of the present invention.
Figure 2:
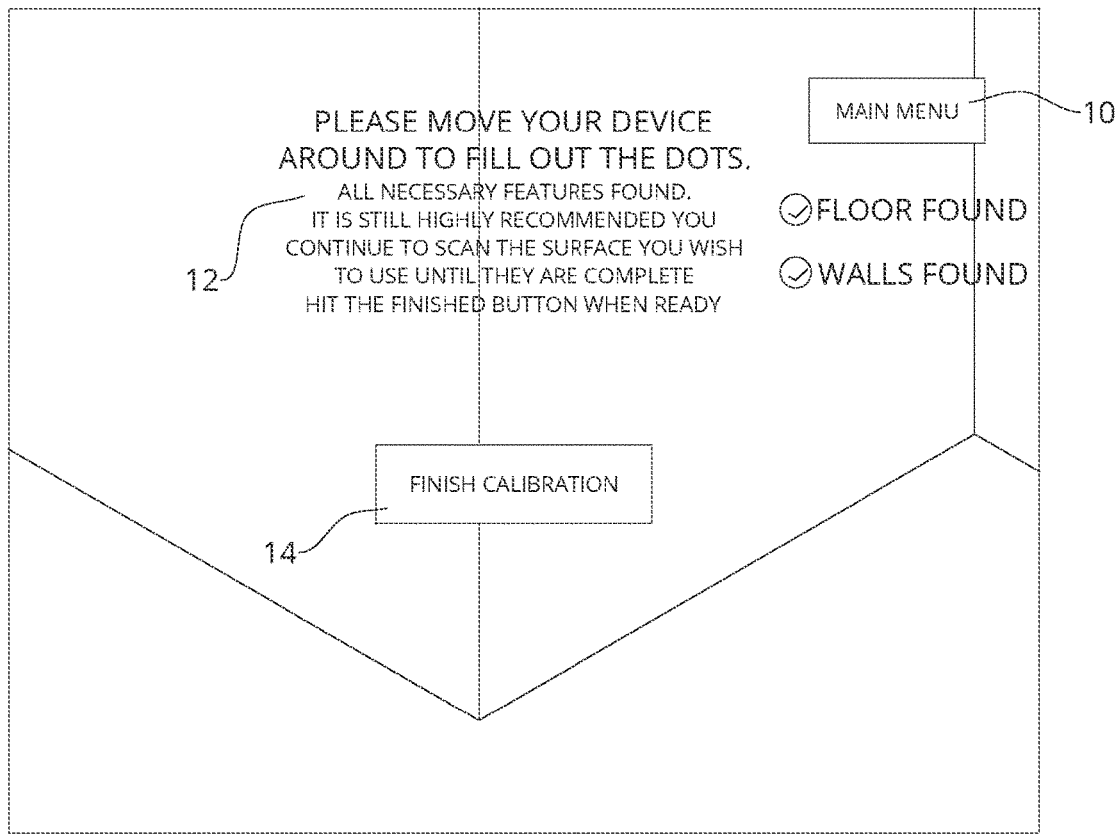
Figure 3:
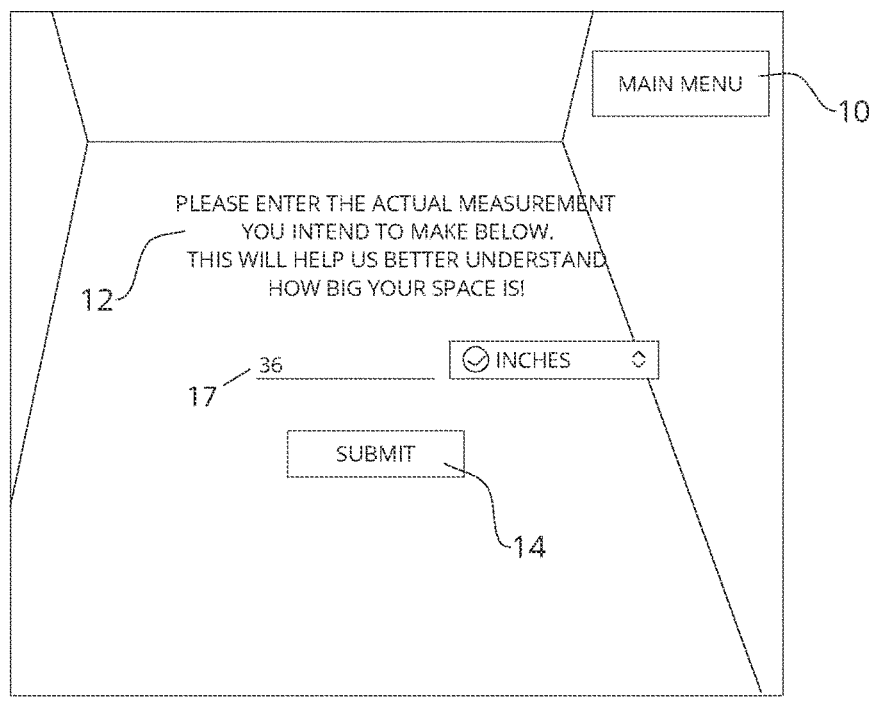

By way of non-limiting example, a user may input the known value 17 of thirty-six inches associated with the known measurement 18, as illustrated in FIG. 3, that is the length of a 36-inch wall segment the user had previously obtained the true and accurate measurement for. Then the user would use the app to drop first and second virtual pins 16 at both ends of the wall segment (known measurement 18). The app then calibrates from this known measurement to obtain a high degree of accuracy for the remaining walls and objects defined by additional virtual pins 16. Thus, the method uses a known accurate measurement provided by the user in order calibrate and to obtain accurate measurements.

Each camera is subject to the features, capabilities, and inaccuracies from the camera manufacturer. Apps which rely on the camera alone will measure the same wall or object differently depending on the provisioning and settings of the camera. Apps which require "markers' ask users to print out and use markers within the field of view, which requires additional work on the part of users.

A method according to aspects of the invention may include the following steps:

1. The user scans the entire area to be measured.
2. The app generates a virtual workspace of the area, including different planes.
3. The user inputs a value that is associated with a known measurement 18 of a length within the scanned area.
4. The user uses an available action 14 within the app to drop a first virtual pin 16 at a desired reference point, an endpoint of the known measurement 18.
5. Then the user uses the available action 14 within the app to drop a second reference pin 16 to define the bounds of the known measurement 18, i.e., the second end point of the length represented by the known measurement 18.
6. A calibration module of the app sets the distance between the two reference pins as equal to the value input by the user.
7. The user continues to place additional virtual pins to define a surface area along the captured workspace, which can be built pin-by-pin and represented on a map that shows the area or layout closed and defined by the plurality of reference pins 16.
8. The app extrapolates the remaining measurements between adjacent virtual pins 16 placed by the user based on the calibration of the known measurement 18.

The system of the present invention may include at least one computing device with a user interface. The computing device may include any computer including, but not limited to, a desktop, laptop, and smart device, such as, a tablet and smart phone. The computing device includes a program product including a machine-readable program code for causing, when executed, the computer to perform steps. The program product may include software which may either be loaded onto the computing device or accessed by the computing device. The loaded software may include an application on a smart device. The software may be accessed by the computing device using a web browser. The computer may access the software via the web browser using the internet, extranet, intranet, host server, internet cloud and the like.

The method embodied by the present invention may be executed through an app running on a mobile computing device provisioned with an image capturing device or video input device.

The first step incorporates a calibration phase where users scan the entire area where they will be taking measurements. The represented workspace enables the user to select a series of points (virtual pins) defining line segments connecting two adjacent virtual pins. The present invention includes a selection system for specifying the location of the virtual pins along the virtual workspace. In some embodiments, a plurality of reference points is presented in an augmented camera view of the virtual workspace presented on the display of the mobile computing device.

Figure 4:
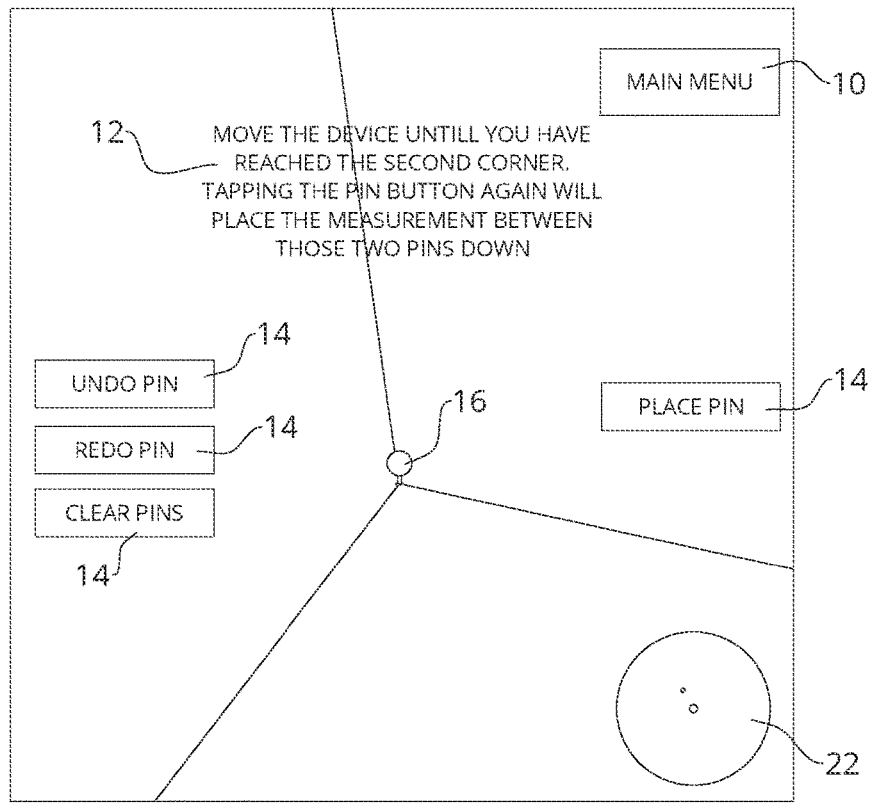
Figure 5:
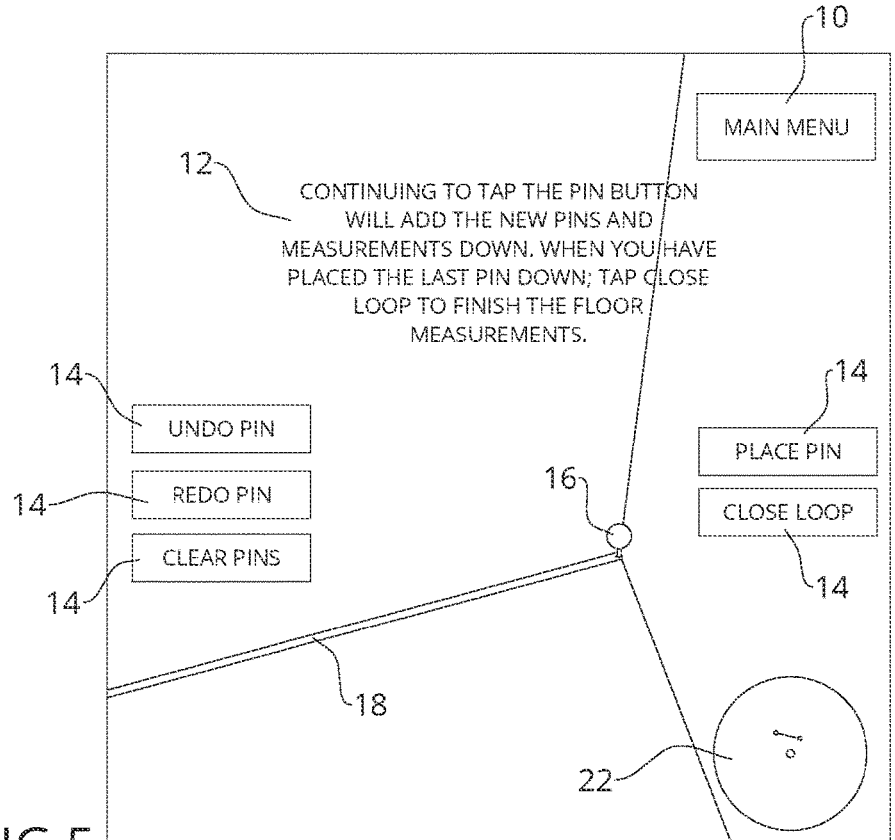
Figure 6:
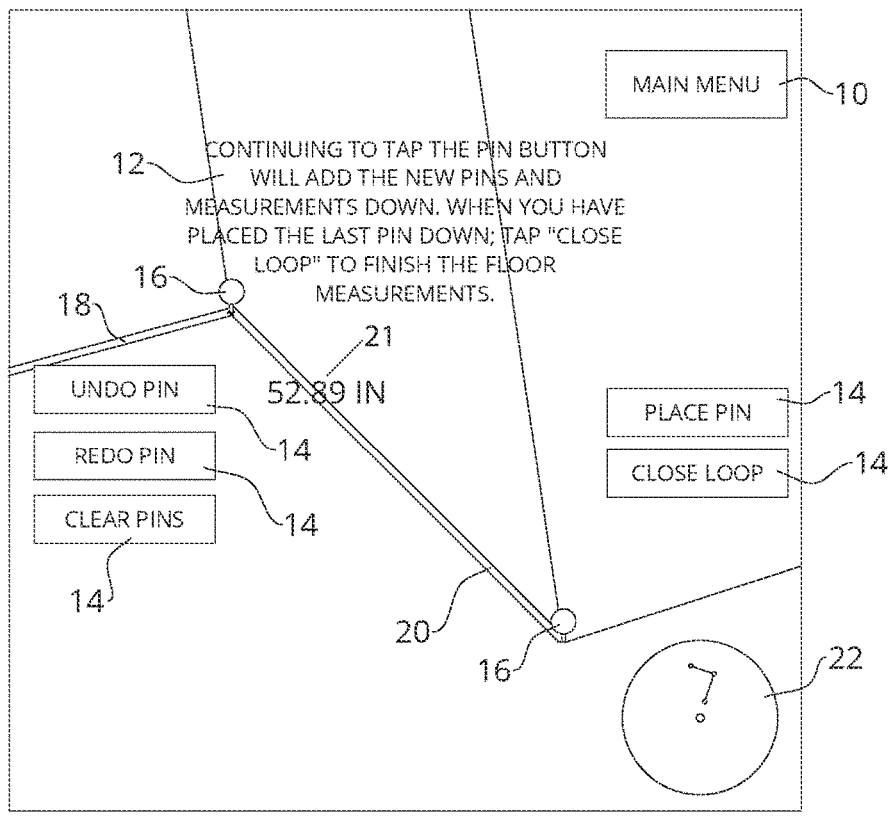
Figure 7:
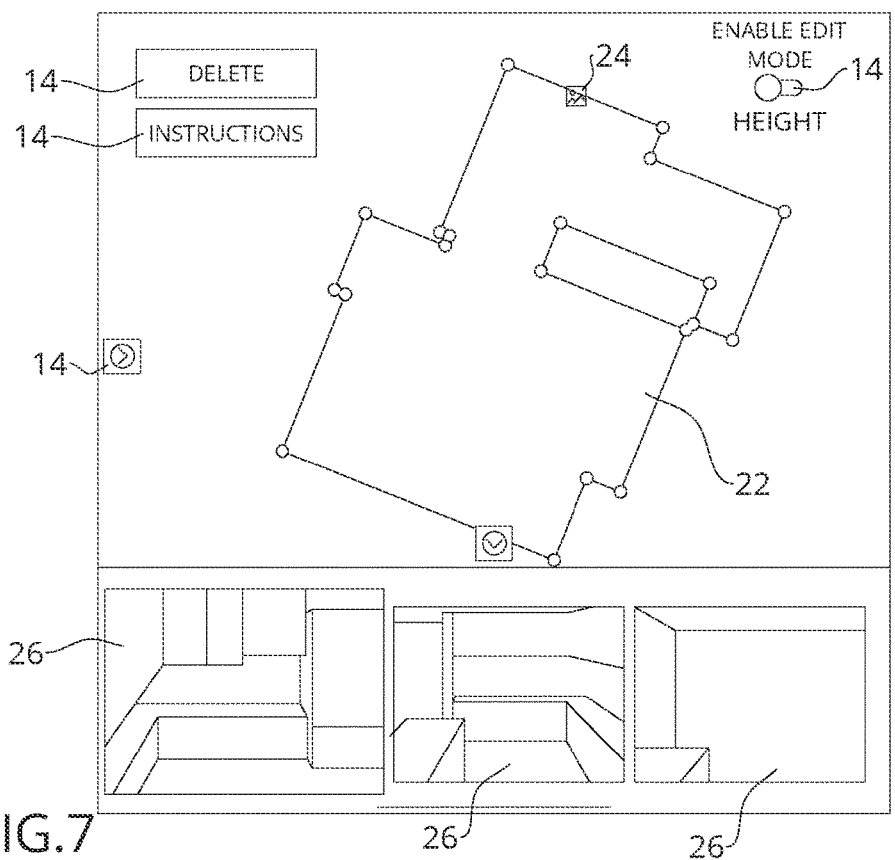
FIG. 7 is a schematic view of an exemplary embodiment of the present invention, illustrating a layout of a closed loop represented on a user interface or display, wherein the layout of the closed loop is the captured surface area further defined by the virtual pins during the calibration process (the first and second virtual pins) and the one or more additional virtual pins placed during the surface area measurement process.

This allows the app to build and generate a map 22 or layout of the area defined by the reference points 16, wherein the map 22 may be a thumbnail (as shown in FIGS. 4-6) on the display of the user interface or may be shown as the primary view, as illustrated in FIG. 7. The user interface may display photos 26 taken of the captured workspace juxtaposed to the map 22. A photo icon 24 may be displayed on the final form map 22 in a location associated with at least one of the display photo 26 for visually assisting the user's frame of reference and overall 'vision' of the captured workspace.

The user interface may also provide available action 14 buttons and a main menu button 10 to select between a list of available actions 14. The available actions 14 include but are not limited to enabling the user to zoom in and out of the virtual workspace and rotate the map and enlarge or reduce the map 22. The available action 14 enables the user to clear, redo and undo virtual pins 16 as well as signal the application to finalize the surface area to be measured by way of a 'close loop' button. The reference dots 16 may be presented using Unity and ARKit frameworks, which are readily available to all mobile developers. The application enables a user to select a line segment 20 (between two adjacent virtual pins 16) and display its length value 21 on the map 22 display or the representation of the virtual workspace. Furthermore, one of the available action buttons 14 is the presentation of instructions 12 along the display so that a user may read the instructions as they perform the steps laid out herein.

The mapping module of the present invention starts building an internal model of the environment acquired by scanning the first and second virtual dots, and from there continues to build the model as user continues to scan the region with the data capture device about the region. This subsequent data acquisition may result in an "intermediate" representation (see FIGS. 4-6) prior to its final form (shown on FIG. 7).

The next step is to prompt the user for a value of the length of the object having a known physical length to be measured. This can be input in various units of measurements such as feet, inches, centimeters, or meters. The user is prompted to place a pin at a first reference point and again at a subsequent reference point. The known measurement between the first reference point and the subsequent reference point is entered through a user interface.

The user input of the known value 17 of the known measurement 18 into the app allows the app in conjunction with the calibration module to measure future distances (lengths of line segments between subsequently-place virtual pins) more accurately within the measured space than any other known application without requiring users to insert physical markers into the environment. In addition, any length or object within the scanned environment may be used. The user is not restricted to any specific length. The app does not need to be programmed in advance with any specific details of the environment or its objects.

For example, after the first two pins are dropped into the environment which represents the known measurement, all other pins dropped can be accurately measured. This method allows measurements to be taken with increased accuracy. In some embodiments, the known value 17 provides the "true" length which the present invention can compare with a measured value of the known measurement 18, and from there construct a training data set to which the system can use linear regression to determine parameters for linear approximation and in turn develop corrective calibrations to apply to subsequent measured values during subsequent data collections.

In some embodiments, each device (CPU, RGBD camera, IMU, etc.) may have its own internal clock. In order to achieve optimum accuracy of the system, every millisecond may count. Accordingly, some embodiments synchronize the different clocks. Some of these embodiments may standardize on CPU time and convert all the other clocks to this time.

Our testing shows most measurements are approximately 97% to 99.47% accurate to that of a measuring tape up to 25 feet. Other methods for measurement can have good accuracy but are affected by individual camera characteristics or require the user to insert physical markers into the environment. To date, no other application uses this method to increase measurement accuracy.

In some embodiments, the method may include the following steps:

Step 1. The user scans the entire area to be measured.

Step 2. The app generates a virtual workspace of the area, including different planes; the virtual workspace captures and a length of a known or knowable physical value, hereinafter referred to as "known measurement" 18.

Step 3. The user inputs a known measurement 18 of a length within the scanned area/virtual workspace.

Step 4. The user uses a button within the app to drop a first "pin" at one end of the length of the known measurement (e.g., a length of wall or object).

Step 5. Then the uses a button within the app to drop a second "pin" at the other end of the length of the known measurement 18.

Step 6. The app sets the distance between the two pins as equal to the value input by the user.

Step 7. The user continues to measure other objects or define boundary points of a (enclosed) surface area by dropping more virtual pins.

Step 8. The app extrapolates the remaining measurements taken by the user (the distance of all the remaining line segments defined by two adjacent virtual pins) so as to determine each length and calculate surface area, volume or any other geometric formula based on these measurements based on the lengths of the plurality of boundary lines defined by the user in view of the known measurement 18 of the calibration process.

The process to make the invention requires a combination of three main processes. The first is a camera to perform a scan of the area to be measured. In this step, the software builds out a virtual workspace that represents the captured surface area by, among other things, detecting planes (floor, ceiling, walls, ground, etc.)

The second process is gathering the known measurement from the user. This includes prompting the user for the measurement value and placing virtual pins at each end of the known length to be measured.

The third process is to extrapolate the known measurement into the environment. Any additional virtual pins placed will derive their measurements from the scanned environment.

Additional elements such as improved camera resolution, adding "markers" inserted into the environment or different camera measurement technologies such as LIDAR vs regular photographs can increase accuracy.

The calibration step and the user input step could be made in any order.

In some implementations, the user could place the virtual pins first then go back and conduct the calibration and user input steps. This would likely decrease the accuracy, but it is possible to perform the steps in different orders.

The user would install the app on their device, such as a mobile phone or tablet or other mobile computing device. The user would then start the application. The app will prompt the user to move their device around the area they wish to measure to build a model of it.

Once the device is calibrated, the user would input the known measurement of whatever length is being measured within the captured environment. The user would then use the app to place a virtual pin at the start and end of the length to be measured. The user would then proceed to place virtual pins at the remaining points to be measured.

FIG. 7 shows where the captured images 26 associated with a specific length in the floor plan/layout map 22 indicated by the picture icon 24. The floor plan/layout is dimensionally accurate based on virtually-pinned boundary points in view of the calibration done based on the known measurement 18.

In an exemplary process, a pin 16 may be dropped at the bottom of the peninsula cabinets and the user raises the reticle up to the height of the cabinets, and the application represents this with the vertical green bar. After the user drops a pin on the countertop to record the height, the application switches to measuring width and the green bar now gets wider until the user drops a pin to specify the width. Finally, the green rectangle grows in length until the user drops a final pin to determine the length. This object is then stored in the floor plan as demonstrated by the "mini map" circle in the bottom right corner.

This method of measuring could be implemented in stand-alone products and could be incorporated into other services. The present invention takes user input for two different points in space. The user then inputs the known distance between these two points. This reference measurement is then used to measure all other distances and points. This greatly increases the accuracy of all measurements over other methods.

The present invention prompts users where to take pictures using a round, 3D button shape on each edge of the room. These prompts are stationary in space and do not move as the user holding the mobile device does. Users position themselves in front of these buttons in order to take a picture of each edge in the floor plan.

The application tracks the location of these pictures in relation to the measurement points within the room. This allows the application to associate the pictures with given objects such as walls, ceilings, floors, furniture, or other objects within the room.

The present invention allows the user to measure any object without the need to take a photograph or have any prior understanding of what the object is. The measurements are not constrained by walls, floors or ceilings and can be used to measure any object within the or workspace.

The computer-based data processing system and method described above is for purposes of example only and may be implemented in any type of computer system or programming or processing environment, or in a computer program, alone or in conjunction with hardware. The present invention may also be implemented in software stored on a non-transitory computer-readable medium and executed as a computer program on a general purpose or special purpose computer. For clarity, only those aspects of the system germane to the invention are described, and product details well known in the art are omitted. For the same reason, the computer hardware is not described in further detail. It should thus be understood that the invention is not limited to any specific computer language, program, or computer. It is further contemplated that the present invention may be run on a stand-alone computer system having a processor or may be run from a server computer system that can be accessed by a plurality of client computer systems, each having a processor, interconnected over an intranet network, or that is accessible to clients over the Internet. In addition, many embodiments of the present invention have application to a wide range of industries. To the extent the present application discloses a system, the method implemented by that system, as well as software stored on a computer-readable medium and executed as a computer program to perform the method on a general purpose or special purpose computer, are within the scope of the present invention. Further, to the extent the present application discloses a method, a system of apparatuses configured to implement the method are within the scope of the present invention.

It should be understood, of course, that the foregoing relates to exemplary embodiments of the invention and that modifications may be made without departing from the spirit and scope of the invention as set forth herein.

What is claimed is:

1. A method for measuring a workspace, the method comprising:
    displaying on a user interface of a computing device, via a processor, running on the computing device, a virtual workspace of a space captured by an image capturing device operatively associated with the computing device;
    identifying, via a user interfacing with the user interface, first and second selections along the virtual workspace, wherein the first and second selections define a set of two boundary points of a length of a knowable value;
    inputting, via the user interface, a known value of the knowable value;
    directly from the virtual workspace, calculating, via the processor, a measurement of the length of the knowable value as defined by the two boundary points on the virtual workspace;
    calibrating, via the processor, a calibration ratio between the inputted known value and said measurement of the length of the knowable value; and
    applying, via the processor, the calibration ratio against a subsequent measurement by the processor of another set of two boundary points identified along the virtual workspace by the user interfacing with the user interface,
    whereby accuracy of measurements along the virtual workspace by the processor of subsequent sets of two boundary points is improved without having to lay physical markers along the space.

2. The method of claim 1, further comprising:
    receiving, via the processor, at least one or more additional selections by the user, via the user interface, along the virtual workspace, defining one or more, respectively, sets of two boundary points of a closed space;
    measuring, by the processor, a length of each set of two boundary points; and
    applying, via the processor, the calibration ratio against each subsequent measurement to determine a corrected length for each set of two boundary points.

3. The method of claim 2, wherein each selection is a virtual dot.

4. The method of claim 2, wherein operative association of the image capturing device and the space comprises scanning the space.

5. The method of claim 2, further comprising displaying, via the processor, an intermediate mapping model on the user interface of the computing device, wherein the intermediate mapping model coinciding with each selection.

6. The method of claim 5, wherein the intermediate mapping model is represented within the virtual workspace.

7. The method of claim 6, further comprising displaying, via the processor, a final map defined by all the selections.

8. The method of claim 7, wherein each selection is identified on the final map.

9. The method of claim 8, wherein one or more captured images are juxtaposed with the final map.

10. The method of claim 9, wherein, for each captured image, a photo icon is identified on the final map so as to indicate where along the space from which the captured image was captured.

* * * * *